Nov. 7, 1933.                S. JELINEK                1,933,854
           METHOD OF MAKING CINEMATOGRAPHIC EXPOSURES
                     Filed Aug. 31, 1929
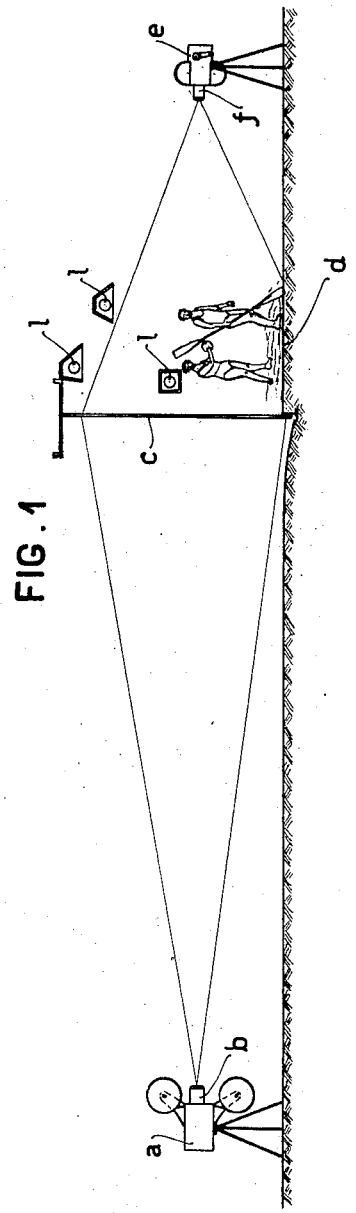
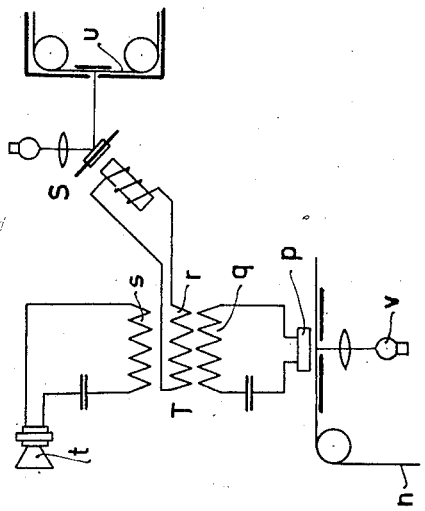
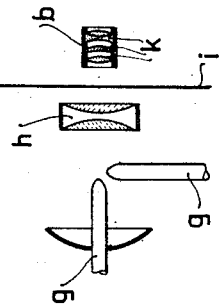
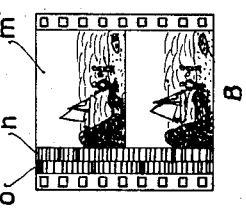
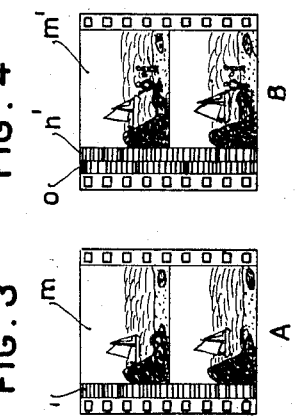
S. Jelinek
INVENTOR
By: Marks & Clerk
ATTYS.

UNITED STATES PATENT OFFICE

1,933,854

METHOD OF MAKING CINEMATOGRAPHIC EXPOSURES

Stephan Jelinek, Vienna, Austria

Application August 31, 1929, Serial No. 389,869, and in Austria January 8, 1929

3 Claims. (Cl. 88—16.2)

This invention relates to a method which enables cinematographic exposures to be made of scenes of which a part, e. g. the background, consists of a projected picture or of a series of pictures produced by cinematographic projection. Such projected pictures are already known to stage practice for representing backgrounds and other parts of scenery. Pictures as used for this purpose, however, cannot be photographed cinematographically, as the intensity of light in them is far too slight, and only suffices for time exposures even when the most powerful projecting lamps at present known are used.

The method provided by the present invention enables scenery of this kind, a part of which consists of projections of fixed or moving pictures, to be photographed cinematographically in a simple manner. This is achieved by producing the projected parts of the scenery in such a manner that the pictures projected onto a screen or the like emit light rich in highly actinic rays, the ultra-violet rays included. As is commonly known, the ultra-violet rays which are invisible to the human eye have a particularly powerful effect on the sensitized surface of the photographic film, and for the carrying out of the method according to the invention sources of light are therefore preferably used which emit light rich in ultra-violet rays, lamps of this sort being already known and used for certain special purposes.

The cinematographic cameras at present in use are designed to utilize for the chemical influencing of the sensitized photographic surface mainly those rays of light which also produce an effect upon the human eye, whereas in the above described form of the new method provided by the present invention the sensitized surface is mainly influenced by the ultra-violet rays which, while being invisible to the eye, exercise a particularly powerful influence on the sensitized surface.

By providing for the influencing of the sensitized surface of the film in the exposing camera by rays which are far more effective than those hitherto used for the purpose of exposure, the invention makes it possible either for the time of exposure to be shortened or for the same "covering power" to be achieved with the same time of exposure but with lighting of far less visual brightness than that hitherto used. The determining factor is not the impression of brightness registered by the eye, but the chemical effectiveness of the rays emitted by the source of light used, this effectiveness being dependent on the proportion of highly actinic (e. g. invisible ultra-violet) rays which are brought to bear on the sensitized surface.

In order that the present invention may be readily understood certain methods of producing films will now be described, by way of example only, with reference to the accompanying drawing, in which:

Fig. 1 is a diagrammatic side elevation of the arrangement of the device used for taking cinematographic pictures according to the invention.

Fig. 2 is a diagrammatic longitudinal section of a part of the projecting apparatus.

Fig. 3 is a detail of a part of a sound film having a picture strip and a sound track.

Fig. 4 is a detail of a part of a sound film having a picture strip and two sound tracks.

Fig. 5 illustrates diagrammatically a method for producing sound films of composite scenes.

For the purpose of taking cinematographic exposures of scenes with projected backgrounds or the like the procedure is to project the picture $i$ representing the background or the like onto a screen $c$ by means of a projecting apparatus $a$, $b$ including a source of light $g$, $g$ which is very rich in highly actinic, and particularly in ultra-violet rays, while the foreground $d$, that is the stage and the actors thereon is lit by sources $e$ of less intensely actinic light. In order that the ultra-violet rays employed in projection can be effective for the purpose of exposure, it is of course necessary that all optical portions of the apparatus interposed in the path of the ultra-violet rays should be pervious to these rays. In the case described, the diapositive $i$ or the like which bears the picture intended for projection on the screen $c$ or the like, as also the condenser $h$ and the objective $b$ of the projecting apparatus $a$, the screen $c$ and the objective $f$ of the exposing camera $e$ must consist of materials which are pervious to ultra-violet rays. Suitable materials for this purpose are for example quartz, fluor spar, uviol glass, certain kinds of artificial resin. Any one of the materials cited does not alone suffice for the lenses $k$ of the projector $a$ and of the exposing camera $e$, and it is necessary to provide for the required correction by a suitable choice or combination of the materials used for the separate lenses $k$ used in the building up of the complete objectives $b$ and $f$.

The present method does away with the difficulty which has always been met with hitherto, namely that the projected background or the like is overpowered by the lighting of the foreground, by ensuring that the projected background or the like is kept as chemically effective in regard to the sensitized surface of the film as the directly lit foreground, and that without proceeding to the limit of the intensity of the reprojecting lamp g (which is determined by other factors). As previously mentioned the determining factor here is not the comparative degrees of brightness between foreground and background as registered by the eye. For the latter for instance the projected background may appear less well lit or even shadowy in comparison with the foreground which is lit by a brighter but less highly actinic light, while the chemical effect on the sensitized surface of the film is equal in the case of both foreground and background.

The foreground may also be lit with light which is rich in ultra-violet rays, only in this case weaker lamps must be used for the lighting of the foreground than in the projector. The brightness of the lighting of the foreground can in this case be so reduced that the foreground appears comparatively dark to the eye.

The projected background can be variable during the cinematographic exposure, that is to say that instead of a single diapositive a running film may be used. In this case the projector a, b is similar to a cineprojector, except that the optical equipment h, b and the film i itself are made of materials which are pervious to ultra-violet rays.

The described method is not limited to the silent film, but can also be used for the recording of tone films. An example of the application of the method for this purpose may be described as follows: A scene is to be recorded on the sea-coast with all the attendant sounds, while the acting of the scene is to be performed in the studio. In this case the procedure is first to take a tone film exposure of the sea-coast alone in the normal manner. The picture strip m of the film A so obtained (Fig. 3) is then projected on the screen c in the studio in the manner indicated above by means of highly actinic, including the ultra-violet, light.

The tone strip n of this film A can then be employed in one of various ways for the production of the final complete tone film. It can for instance be made directly audible in the studio in the usual manner by means of a loud-speaker or the like. In front of the projected background representing the sea-coast, the scene (lit by a less powerfully actinic light) is now played by the actors. The projected moving background together with the foreground (the players) is now exposed and recorded by a tone-film camera, the optical equipment of which is made to allow of the passage of the highly actinic rays used for the projection of the background through to the sensitized surface of the exposing film. Since, during the exposure of the final film in the studio, the sounds of the sea-coast forming the background (reproduced by a loud-speaker or the like) and the sounds proceding from the foreground (speeches of the actors etc.) are simultaneously audible, all these sounds will be recorded together, and the finished film ready for reproduction in the theater has the usual appearance of a tone-film, that is to say it consists of two portions, a picture strip and a tone strip.

Instead of making the sounds of the background audible during exposure in the studio, one can proceed as follows: The tone-film A intended for the projection of the background is projected by means of highly actinic light in its entirety, picture strip m as well as tone strip n, without the tone strip being made audible. The exposure of the whole scene in the studio is then carried out in such a manner that the (now silent) background pictures are exposed and recorded, in the manner indicated, together with the action in the foreground d on the picture strip m' of the composite film B (Fig. 4), while the sounds of the foreground are recorded on a tone strip o and the projected tone-picture of the background is photographed simultaneously with the scene on a special strip n' of the composite film. The finished film ready for reproduction then consists of three portions, namely two tone strips o, n' and one picture strip m', whereby the disposition can be for example such that the tone strip o of the foreground comes first, then the tone strip n' of the background and then the picture strip of the entire scene.

A further procedure, and presumably the most suitable, consists in using the tone strip n of the projected background for the production of the tone strip of the complete film in such a manner that the first-named tone strip, although not made actually audible in the studio, is yet brought to the stage of modulated alternating current in the known process for making films audible. The microphone-current, controlled by the sounds of the foreground simultaneously recorded with the projected background, is then superposed in a known manner by means of induction on the modulated alternating current. The alternating current derived from the tone strip of the background projection influences together with the superposed microphone-current the usual recording device (for instance a string galvanometer or the like) in the recording and exposing camera, so that in the tone strip of the finished film the sounds of the background and those of the foreground are mingled in the same manner as if all these sounds had been originally recorded simultaneously. An arrangement adapted for carrying out this procedure is diagrammatically shown in Fig. 5. In this figure n denotes the background tone strip through which light from a source v is sent in the usual manner so that a photo-electric cell p or the like becomes excited. With this cell p an induction coil q is connected, which forms a primary winding of a transformer T, the secondary winding r of which is simultaneously influenced by another primary winding s, connected with a microphone t, which receives the sounds of the foreground. The coil r of the transformer T is connected with the sound recording device S of any known construction having for instance the form of a galvanometer which influences the tone strip u of the final composite sound film. At the same time the possibility is provided of increasing or reducing the strength of the sounds of the foreground or of the background either together or separately. In the disposition shown, for instance, by adjustment of the two primary coils q and s in relation to the secondary coil r the inducing effect of the one or of the other or of both together can be strengthened or weakened as desired. This arrangement is only intended to serve as an example, since there are various other possibilities provided by the means now known to the technology of tone filming for carrying out the superposing of current mentioned in a manner to be adjustable.

The last mentioned procedure has the advantage over the application of the method according to the invention previously mentioned, in that the tone strip of the film intended for projecting the background can be made directly audible, so that the unavoidable flaws, such as tone distortion, resonance and the like, in the reproduction of the background sounds by a loud-speaker, which are embodied in the finished film, are in this case avoided.

Whichever of the above mentioned methods of producing a tone-film may be used, in each case a possibility is provided of producing inexpensively a tone-film in various languages, since the tone-film of the background need only be produced once for all the languages required.

What I claim is:

1. In a cinematographic method, the steps of passing rays containing ultraviolet rays through a material which is non-absorbent with respect to ultra-violet rays, projecting said rays onto a screen made of a material which is non-absorbent with respect to ultra-violet rays, said rays forming the background of a scene on said screen, illuminating a space adjacent to said screen by rays of an at most the same actinic value as the rays projected on said screen, said space containing the foreground component of said scene, and photographing said screen together with said space to obtain a photograph of the entire scene.

2. In a cinematographic method, the steps of cinematographically recording the pictures and the sounds of a scene, projecting said pictures by rays containing ultra-violet rays onto a screen made of a material which is non-absorbent with respect to ultra-violet rays, said rays forming the background of another scene on said screen, illuminating a space adjacent to said screen by rays of an at most the same actinic value as the rays projected on said screen, said space containing the foreground component of the last-mentioned scene, and simultaneously recording the pictures as well as the sounds of said two scenes.

3. In a cinematographic method, the steps of projecting rays containing ultra-violet rays onto a screen of a material which is non-absorbent with respect to ultra-violet rays, said rays forming the background of a scene on said screen, illuminating a space adjacent to said screen by rays of a lesser intensity than the rays projected on said screen, said space containing the foreground component of said scene, the actinic effect of the background being substantially equal to that of the foreground, and photographing said screen together with said space to obtain a photograph of the entire scene.

STEPHAN JELINEK.